United States Patent
Murray et al.

(10) Patent No.: US 6,597,800 B1
(45) Date of Patent: Jul. 22, 2003

(54) AUTOMATIC TARGET RECOGNITION APPARATUS AND PROCESS

(75) Inventors: Alan Murray, Edinburgh (GB); Richard Reavy, Edinburgh (GB)

(73) Assignee: BAE Systems PLC, Farnborough (GB)

(*) Notice: Subject to any disclaimer, the term of this patent is extended or adjusted under 35 U.S.C. 154(b) by 0 days.

(21) Appl. No.: 09/401,412

(22) Filed: Sep. 22, 1999

Related U.S. Application Data

(63) Continuation of application No. PCT/GB98/03269, filed on Nov. 4, 1998.

(30) Foreign Application Priority Data

Nov. 5, 1997  (GB) ............................................. 9723269
Apr. 24, 1998 (GB) ............................................. 9808712

(51) Int. Cl.$^7$ ................................................. G06K 9/00
(52) U.S. Cl. ...................... 382/103; 382/190; 382/224
(58) Field of Search ............................. 382/103, 190, 382/260, 270, 173, 215, 151, 100, 171, 179, 177, 178, 175, 104, 165.198, 224–225; 345/157, 158, 167; 430/988; 342/66; 348/169, 170, 206, 207.9

(56) References Cited

U.S. PATENT DOCUMENTS

| | | | |
|---|---|---|---|
| 4,803,735 A | | 2/1989 | Nishida et al. |
| 4,906,940 A | * | 3/1990 | Green et al. ................ 382/100 |
| 5,159,667 A | * | 10/1992 | Borrey et al. .............. 395/148 |
| 5,271,067 A | * | 12/1993 | Abe et al. .................. 382/311 |

FOREIGN PATENT DOCUMENTS

| | | |
|---|---|---|
| EP | 0 544 432 | 6/1993 |
| GB | 2 182 796 | 5/1987 |

* cited by examiner

*Primary Examiner*—Bhavesh M. Mehta
*Assistant Examiner*—Seyed Azarian
(74) *Attorney, Agent, or Firm*—Nixon & Vanderhye P.C.

(57) ABSTRACT

Apparatus for automatic recognition of a target object from an infrared or visible light image, includes primary segmentation and classification means (4,8,9,10,11,12) in which objects are either recognised or unrecognised and one or more secondary segmentation means (15,21,22,23,12) applicable to primary segmented image areas in which objects which are unrecognised by the primary segmentation means are further classified and either recognised or rejected.

21 Claims, 1 Drawing Sheet

AUTOMATIC TARGET RECOGNITION APPARATUS AND PROCESS

This is a continuation of PCT application No. PCT/GB98/03269, file Nov. 4, 1999, the entire content of which is hereby incorporated by reference in this application.

BACKGROUND OF THE INVENTION

1. Field of the Invention

This invention relates to an apparatus and a process for automatic recognition of a target object from an infrared or visible light image.

2. Discussion of Prior Art

Conventional Automatic Target Recognition systems involve capturing the image of a real field of view such as by an infrared camera utilising a two dimensional array of light intensity sensitive pixels or a video camera and carrying out processing on the image data to separate and identify objects appearing in the image. The objects are separated from the background and identified or classified to separate classes of object of interest to the viewer from objects of no interest. Conventionally an automatic target recognition system first segments the image to provide regions of interest that are homogeneous in some respect with the primary aim of extracting individual complete objects for later processing. Data about the objects produced in this segmentation are then passed to a feature extraction stage in which object features are extracted which have been chosen optimally to separate the different classes of object present. The features that have been extracted are then used to classify the objects that have been segmented.

This conventional approach suffers from the disadvantage that it is highly sensitive to the complexities of the real image data with the correct classification of target objects being highly dependent on the quality of the object segmentation. If the segmentation process does not produce object data containing features wich accurately represent the object class, then the objects themselves cannot be correctly classified and identified or identified at all.

There is thus a need for a generally improved apparatus and process for automatic recognition of a target object from an infrared or visible light image which improves the accuracy of target object recognition and identification.

SUMMARY OF THE INVENTION

According to one aspect of the present invention there is provided apparatus for automatic recognition of a target object from an infrared or visible light image, including an image producing device;

a primary separator for subjecting the image to primary segmentation in which the image is divided up into one or more primary homogeneous regions each approximating to an object of interest and data is extracted from the image about these primary regions, a first feature extraction device for receiving the extracted primary region data from the primary separator and recognising and extracting features from the extracted primary region data, which features have been predetermined to separate objects in the primary regions into different classes, a first classifying means for receiving the extracted features and classifying them thereby to recognise the or each object in the primary regions or to indicate that one or more of the objects is unclassified and therefore unrecognised, a secondary segmentation unit for receiving from the primary separator data about the original segmented image primary region containing an unrecognised object and for submitting this data to secondary segmentation to provide sub regions of greater homogeneity, and for extracting data from the primary region about the sub regions, a third feature extraction device for recognising and extracting classifying features from the extracted sub region data and, a second classifying means for receiving the extracted sub-region classifying features and utilising them to classify and thereby recognise the or each object in the sub regions or to recognise that the or each object in the sub regions is not a target object.

Preferably the apparatus includes more than one secondary segmentation unit.

Conveniently the first classifying means includes a first classifier for receiving the extracted features from the first feature extraction device and sorting and classifying the extracted features, a first comparator for receiving, in parallel with the first classifier, the extracted features from the first feature extraction device, and generating a value of the probability that the classification by the first classifier is correct, and first assessment means for receiving data from the first classifier and first comparator and determining recognition or non recognition of the or each object in the primary regions.

Advantageously the second classifying means includes a second classifier for receiving the extracted sub region classifying features from the third feature extraction device and sorting and classifying the extracted sub region features, a second comparator, in parallel with the second classifier, for receiving the extracted sub region classifying features from the third feature extraction device, and generating a value of the probability that the classification by the second classifier is correct, and second assessment means for receiving data from the second classifier and second comparator and determining recognition or non recognition of the or each object in the sub regions.

Preferably the first and second assessment means are combined in a single assessor unit.

Conveniently the apparatus including a frame memory store for receiving and storing data from the image producing device for passage to the primary separator.

Advantageously the apparatus includes a feature store for receiving data from the first feature extraction unit and for passing the data to the first classifying means.

Preferably the apparatus includes a secondary store for receiving and storing image data from the frame memory store for passage to the secondary segmentation unit.

Conveniently the primary separator is operable to output bounding box data to the first feature extraction device, and including an image region extending device operable to receive the primary segmentation bounding box data outputted from the first feature extraction device extend the image region described by the bounding box data and pass the extended region data as a control signal to the secondary store and to the frame memory store.

According to another aspect of the present invention there is provided a process for automatic recognition of a target object from an infrared or visible light image, including the steps of subjecting the image to primary segmentation in which the image is divided up into one or more primary homogeneous regions each approximating to an object of interest, extracting data from the image about these primary regions, recognising and extracting features from the extracted primary regions, which features have been predetermined to separate objects in the primary regions into different classes, utilising the extracted features to classify and thereby recognise the or each object in the primary regions or to indicate that one or more of the objects is unclassified and therefore unrecognised, subjecting the original segmented image primary region containing an unrecognisable object to secondary segmentation to provide sub regions of greater homogeneity, extracting data from the primary region about the sub regions, recognising and extracting classifying features from the extracted sub region data and, utilising the extracted classifying features to classify and thereby recognise the or each object in the sub regions or to recognise that the or each object in the sub regions is not a target object.

Preferably the process includes more than one secondary segmentation.

Conveniently the data relating to the object recognised or unrecognised from the primary segmentation steps is compared with data relating to the object recognised or unrecognised from the or further secondary segmentation steps and assessed to provide object recognition or rejection.

Advantageously the assessment involves the production and consideration of a probability estimate value for each segmentation.

Preferably the primary segmentation is carried out by bounding the primary regions in dependence upon the intensity of illumination change at the boundary.

Conveniently the or each secondary segmentation is carried out by passing the data through a series of four modules each of which assesses the change of illumination intensity at the boundary or edge of the secondary region at different intensity change thresholds.

Advantageously the or each secondary segmentation is carried out by subjecting the data to a Fast Fourier Transform in two dimensions.

Preferably primary segmentation is carried out to produce data comprising image region bounding box data, binary mask data and grey level data from which said features are extracted.

Conveniently the image region described by the primary bounding box data is extended to produce the sub regions of greater homogeneity to form extracted primary data, primary classifying features are extracted from the primary binary mask data and primary grey level data, the primary classifying features are submitted to an assessment and prediction of the optimum secondary segmentation route to form further extracted primary data, and the extracted primary data is submitted to secondary segmentation.

BRIEF DESCRIPTION OF THE DRAWINGS

For a better understanding of the present invention and to show how the same may be carried into effect, reference will now be made, by way of example, to the accompanying drawings, in which.

DETAINED DISCUSSION OF EMBODIMENTS

Figure 1:
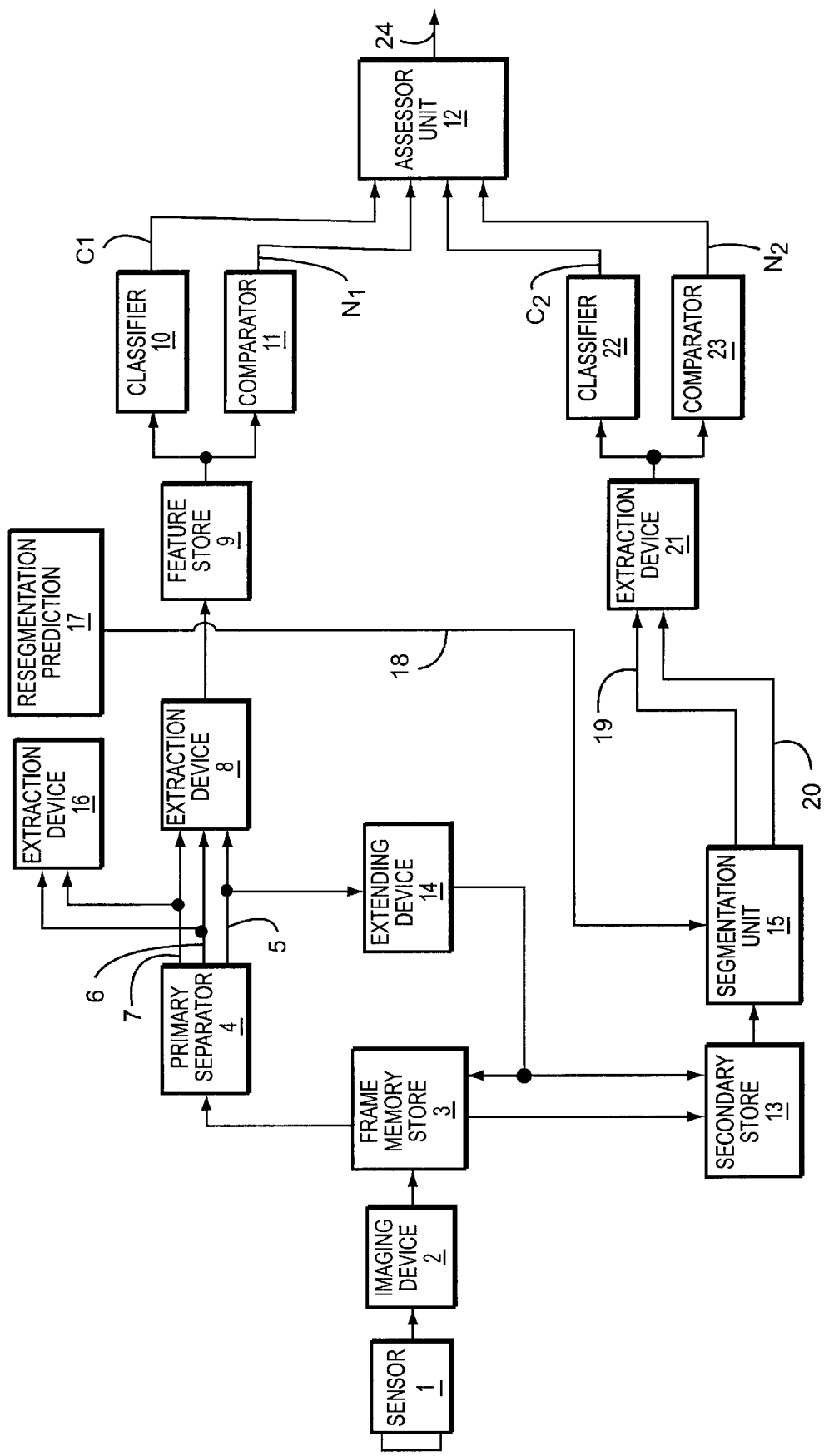
FIG. 1 is a block diagram showing the hardware architecture for an apparatus according to the present invention for automatic recognition of a target object.

The process and apparatus of the present invention herein described for automatic recognition of a target object from an infrared or visible light image basically involves two or more stages of segmentation of the image. Whilst the apparatus and process are intended to operate for recognition of objects in a field of view such as in a surveillance role to identify the presence of people or vehicles in a high security area, they may also be employed for pattern recognition such as to identify hand writing, finger prints or printed text. The process of the invention is carried out in real time on live data.

Thus both the apparatus and process can be divided up into a primary segmentation stage and one or more secondary segmentation stages. The primary segmentation requires the step of subjecting the image produced by observing the field of view with an sensor 1 sensitive to infrared or visible light radiation to produce an image on a video or imaging device 2. Typically for infrared use the device 2 contains a two dimensional array of pixels such as an array of 512 pixels by 256 pixels. The image data at the device 2 is then subjected to primary segmentation by division into one or more primary homogenous regions each approximating to an object of interest.

In this context data from the real image produced by the device 2 is passed to a frame memory store 3 from which the data from the image about these primary regions is extracted at a primary separator 4. The type of data which is produced by the separator 4 preferably is bounding box, binary mask and grey level data for each object. The bounding box is the rectangle which just encloses the segmented pixels forming a primary homogeneous region and the information is outputted from the separator 4 along the line 5. The binary mask is a binary image of the contents of the bounding box where 1 is equivalent to a segmented pixel and 0 is equivalent to a non segmented pixel with the output from the separator 4 for the binary mask being along the output line 6. Grey level data is the data from the original image from the sensor 1 from within the bounding box and is outputted from the segmentor 4 along the output line 7. The primary separator 4 may operate in any convenient manner such as to Sobel filter the image frames followed by histogram based threshold determination in which the grey level histogram is analysed to produce boundaries around an object at which notable changes in intensity of illumination occur.

Data from the output lines 5, 6 and 7 is passed to a first feature extraction device 8. The device 8 particularly utilises the grey level and binary mask data received along output lines 6 and 7 from the primary separator 4 to recognise and extract features from the extracted primary regions which features have been predetermined to separate objects in the primary regions into different classes. The features extracted may include Fourier transform features, moment based features such as geometric and Legendre and simple statistics such as aspect ratio, percentage foreground and compactness. These features are compared with a database of known well segmented target features and passed to a feature store 9. From the feature store 9 the extracted feature data is fed to a classifier 10 which sorts and classifies the extracted features. In parallel with this activity the extracted feature data from the store 9 is fed to a comparator 11 which establishes a probability estimate value for the features extracted by the segmentation. The classifier 10 and comparator 11 form part of first classifying means. Data from the classifier 10 and comparator 11 are fed to an assessor unit 12 which weighs and considers the suggested classification or identification of the object by the classifier 10 in conjunction with the probability that the identification is correct as suggested by the comparator 11 and either recognises the object which results in an identification output from the assessor unit 12 or indicates that one or more of the objects in the primary regions is unclassified and at this stage unrecognised.

In the process and apparatus of the present invention the original segmented image primary region data received from the frame memory store 3 and containing an unrecognised object is subjected to secondary segmentation to provide sub regions of greater homogeneity. Thus image data is taken from the frame memory store 3 and put into a secondary store 13. Information from the original segmented image primary region containing the unrecognised object is taken from the boundary box output line 5 and fed to an image region extending device 14 which extends the image region described by the bounding box data produced by the primary segmentation unit 4. This is done in the device 14 by the addition of a margin which produces a new grey image area. The extended region data is outputted from the device 14 as a control signal to both the secondary store 13 and the frame memory store 3. The image data modified in this way is outputted from the secondary store 13 to a secondary segmentation unit 15 for secondary segmentation to provide sub regions of greater homogeneity.

To assist in the secondary segmentation process grey level data is taken from the output line 7 and binary mask data is taken from the output line 6 and fed to a second feature extraction device 16 where classifying features are extracted from the primary segmentation data for the previous frame in the sequence. Data from the second feature extraction device 16 is passed to a resegmentation prediction unit 17 which estimates the optimum secondary segmentation process for the object by classifying the set of features produced from the grey level and binary masked data in comparison with a previously prepared database of recognisable features of recognisable target objects. This is done in any convenient manner such as by using a standard K-Nearest-Neighbour/MLP (multi layer perceptron) technique.

The data outputted from the unit 17 thus is in the form of an optimum further segmentation strategy which is passed by line 18 to the secondary segmentation unit 15 where it is utilised in the secondary segmentation of the extended image data produced by the image region extending device 14. This produces grey level data outputted by line 19 and binary mask data outputted by line 20. Hence for secondary segmentation the unit 15 receives extended image data via the image region extending device 14 and secondary store 13 and grey level and binary mask data via the second feature extraction device 16 and resegmentation prediction unit 17. The resulting grey level and binary mask data for the secondary segmentation step is outputted to a third feature extraction device 21 where features are extracted from the grey level and binary mask data received from the unit 15. In the event of the segmentation in the unit 15 producing multiple fragmented spots only the most central object is considered significant.

The device 21 recognises and extracts classifying features from the extracted sub region data and passes the information to a second classifier 22 and to an in parallel second comparator 23 which provides a proposed list of classified features and an output from the unit 23 of the probability estimate value of the classification. The second classifier 22 and second comparator 23 form part of second classifying means.

The classified feature information produced by the primary segmentation classifier 10 is outputted as $C_1$ and the classified feature data produced by the second classifier 22 from the secondary segmentation is outputted as $C_2$. The probability estimate value for the primary segmentation is outputted from the comparator 11 as $N_1$ and the probability estimate value for the secondary segmentation is outputted from the second comparator 23 as $N_2$. The data represented by $C_1$, $C_2$, $N_1$ and $N_2$ is passed to the assessor unit 12 where a final classification decision is made on the basis of the following criteria;

If $N_1$ is less than $T_1$ then the classification choice is $C_1$ ($T_1$ is the novelty threshold)

If $N_1$ is greater than or equal to $T_1$ but $N_2$ is less than $T_2$ then the classification choice is $C_2$.

If $N_1$ is greater than or equal to $T_1$ and $N_2$ is greater than or equal to $T_2$ then the object is rejected as unrecognised and not a relevant target object.

The three distinct decisions made in the assessor unit 12, namely object of class $C_1$ object of class $C_2$ or rejected object are outputted from the unit 12 via output line 24.

In general the novelty threshold $T_1$ will be less than the novelty threshold $T_2$ as the requirement for low novelty can be relaxed when testing secondary segmented objects. The threshold values can be set according to the particular application for the process of the invention rather in the nature of a fine tuning adjustment. Essentially the threshold values provide a mechanism for tuning detection probability and classification performance and if low values are set for the novelty threshold more objects will be rejected as unclassified and therefore for not being target objects, with a correspondingly higher confidence being created that the classified and therefore recognised target objects are realistic. Of course secondary segmentation is not required if the classifier 10 and comparator 11 for primary classification give a value where $N_1$ is less than $T_1$. In other words further segmentation is not necessary if initial classification is good with the object having and therefore good probability estimate value.

Although only one secondary resegmentation step has been described and illustrated in the hardware architecture of FIG. 1, it is to be understood that as many secondary or further segmentation steps as necessary can be envisaged.

Conveniently each secondary segmentation is carried out by passing the data through a series of four modules each of which assesses the change of illumination intensity at the boundary or edge of the secondary region at different intensity change thresholds.

Whatever happens the process will involve sequential capture of an image frame by frame with the primary segmentation being carried out on the captured frames at a time delay corresponding to one frame. The secondary segmentation will be carried out with a time delay of two frames and further segmentation would be carried out at a time delay of three or more frames depending upon the number of segmentation steps. The feature store 9 holds the results of the primary segmentation for one frame whilst the secondary segmentation process is carried out.

What is claimed is:

1. Apparatus for automatic recognition of a target object from a multimetric wave infrared or visible light image, including an image producing device;

a primary separator for subjecting the image to primary segmentation in which the image is divided up into one or more primary homogeneous regions each approximating to an object of interest and data is extracted from the image about these primary regions, a first feature extraction device for receiving the extracted primary region data from the primary separator and recognising and extracting features from the extracted primary region data, which features have been predetermined to separate objects in the primary regions into different classes, a first classifying means for receiving the extracted features and classifying them thereby to recognise each object in the primary regions or to indicate that one or more of the objects is unclassified and therefore unrecognised, a secondary segmentation unit for receiving from the primary separator data about the original segmented image primary region containing an unrecognised object and for submitting this data to secondary segmentation to provide sub regions of greater homogeneity, and for extracting data from the primary region about the sub regions, a third feature extraction device for recognising and extracting classifying features from the extracted sub region data and, a second classifying means for receiving the extracted sub-region classifying features and utilising them to classify and thereby recognise each object in the sub regions or to recognise that each object in the sub regions is not a target object.

2. Apparatus according to claim 1, including more than one secondary segmentation unit.

3. Apparatus according to claim 1, wherein the first classifying means includes a first classifier for receiving the extracted features from the first feature extraction device and sorting and classifying the extracted features, a first comparator for receiving, in parallel with the first classifier, the extracted features from the first feature extraction device, and generating a value of the probability that the classification by the first classifier is correct and first assessment means for receiving data from the first classifier and first comparator and determining recognition or non recognition of each object in the primary regions.

4. Apparatus according to claim 1 wherein the second classifying means includes a second classifier for receiving the extracted sub region classifying features from the third feature extraction device and sorting and classifying the extracted sub region features, a second comparator, in parallel with the second classifier, for receiving the extracted sub region classifying features from the third feature extraction device, and generating a value of the probability that the classification by the second classifier is correct, and second assessment means for receiving data from the second classifier and second comparator and determining recognition or non recognition of each object in the sub regions.

5. Apparatus according to claim 3 wherein the first and second assessment means are combined in a single assessor unit.

6. Apparatus according to claim 1, including a frame memory store for receiving and storing data from the image producing device for passage to the primary separator.

7. Apparatus according to claim 1, including a feature store for receiving data from the first feature extraction device and for passing the data to the first classifying means.

8. Apparatus according to claim 6, including a secondary store for receiving and storing image data from the frame memory store for passage to the secondary segmentation unit.

9. Apparatus according to claim 8, wherein the primary separator is operable to output bounding box data to the first feature extraction device, and including an image region extending device operable to receive the primary segmentation bounding box data outputted from the first feature extraction device extend the image region described by the bounding box data and pass the extended region data as a control signal to the secondary store and to the frame memory store.

10. Apparatus according to claim 1 including a second feature extraction device for receiving grey level data and binary mask data outputted from the primary separator and for extracting classifying features from the primary segmentation data for the previous frame in the sequence.

11. Apparatus according to claim 10, including a resegmentation prediction unit for receiving extracted primary segmentation classifying features from the second feature extraction device which estimates the optimum secondary segmentation process for the object of the classifying features and passes the process strategy as a control signal to the secondary segmentation unit.

12. A process for automatic recognition of a target object from an infrared or visible light image, including the steps of;

subjecting the image to primary segmentation in which the image is divided up into one or more primary homogeneous regions each approximating to an object of interest, extracting data from the image about these primary regions, recognising and extracting features from the extracted primary regions, which features have been predetermined to separate objects in the primary regions into different classes, utilising the extracted features to classify and thereby recognise each object in the primary regions or to indicate that one or more of the objects is unclassified and therefore unrecognised, subjecting the original segmented image primary region containing an unrecognised object to secondary segmentation to provide sub regions of greater homogeneity, extracting data from the primary region about the sub regions, recognising and extracting classifying features from the extracted sub region data and, utilising the extracted classifying features to classify and thereby recognise each object in the sub regions or to recognise that each object in the sub regions is not a target object.

13. A process according to claim 12, including more than one secondary segmentation.

14. A process according to claim 12, in which data relating to the object recognised or unrecognised from the primary segmentation steps is compared with data relating to the object recognised or unrecognised from each further secondary segmentation steps, and assessed to provide object recognition or rejection.

15. A process according to claim 14, in which the assessment involves the production and consideration of a probability estimate value for each segmentation.

16. A process according to any claim 13, in which the primary segmentation is carried out by bounding the primary regions in dependence upon the intensity of illumination change at the boundary.

17. A process according to claim 16, in which each secondary segmentation is carried out by passing the data through a series of four modules each of which assesses the change of illumination intensity at the boundary or edge of the secondary region at different intensity change thresholds.

18. A process according to claim 16, in which each secondary segmentation is carried out by subjecting the data to a Fast Fourier Transform in two dimensions.

19. A process according to claim 13, in which primary segmentation is carried out to produce data comprising image region bounding box data, binary mask data and grey level data from which said features are extracted.

20. A process according to claim 19, in which the image region described by the primary bounding box data is extended to produce the sub regions of greater homogeneity to form extracted primary data, primary classifying features are extracted from the primary binary mask data and primary grey level data, the primary classifying features are submitted to an assessment and prediction of the optimum secondary segmentation route to form further extracted primary data, and the extracted primary data is submitted to secondary segmentation.

21. An automatic target recognition device when operation according to the process of claim 13.

* * * * *